United States Patent [19]

Inoue

[11] 4,408,113
[45] Oct. 4, 1983

[54] ELECTRICAL MACHINING APPARATUS

[75] Inventor: Kiyoshi Inoue, Tokyo, Japan

[73] Assignee: Inoue-Japax Research Incorporated, Yokohama, Japan

[21] Appl. No.: 202,232

[22] Filed: Oct. 30, 1980

Related U.S. Application Data

[63] Continuation-in-part of Ser. No. 4,987, Jan. 19, 1979, Pat. No. 4,289,947.

[30] Foreign Application Priority Data

Mar. 2, 1978 [JP] Japan .................................. 53-25633
Aug. 28, 1978 [JP] Japan ................................ 53-117434

[51] Int. Cl.³ ............................................... B23P 1/08
[52] U.S. Cl. .............................. 219/69 M; 219/69 V; 219/69 D; 204/129.7
[58] Field of Search ............... 219/69 R, 69 M, 69 D, 219/69 G, 69 V; 204/129.6, 129.7

[56] References Cited

U.S. PATENT DOCUMENTS 3,378,473  4/1968  Inoue ................................ 204/129.7

Primary Examiner—M. H. Paschall
Attorney, Agent, or Firm—Karl F. Ross; Herbert Dubno

[57] ABSTRACT

An electrical machining (e.g. EDM) apparatus having a worktank for containing a machining liquid and having a workpiece immersed therein; and a tool electrode positionable to be juxtaposed with the workpiece in the worktank to define an electrical machining gap therebetween filled with the machining liquid. The apparatus includes an ultrasonic assembly disposed in the worktank and comprises a head member and a support member. The head member is constituted by a housing having an ultrasonic transducer element supported therein and an opening for permitting only one of the two opposite surfaces of the transducer element to be held in contact with the machining liquid and to communicate with the region of the machining gap via the machining liquid. The head member is supported in the worktank by the support member, which may include a flexible multi-joint pipe or linkage, so that the opening is directed selectively towards the region of the machining gap. The transducer is energized by a power supply to provide ultrasonic vibrations, preferably in excess of 50 kHz and up to 10 MHz, which are transmitted by the machining liquid preferentially to the machining gap region.

18 Claims, 12 Drawing Figures

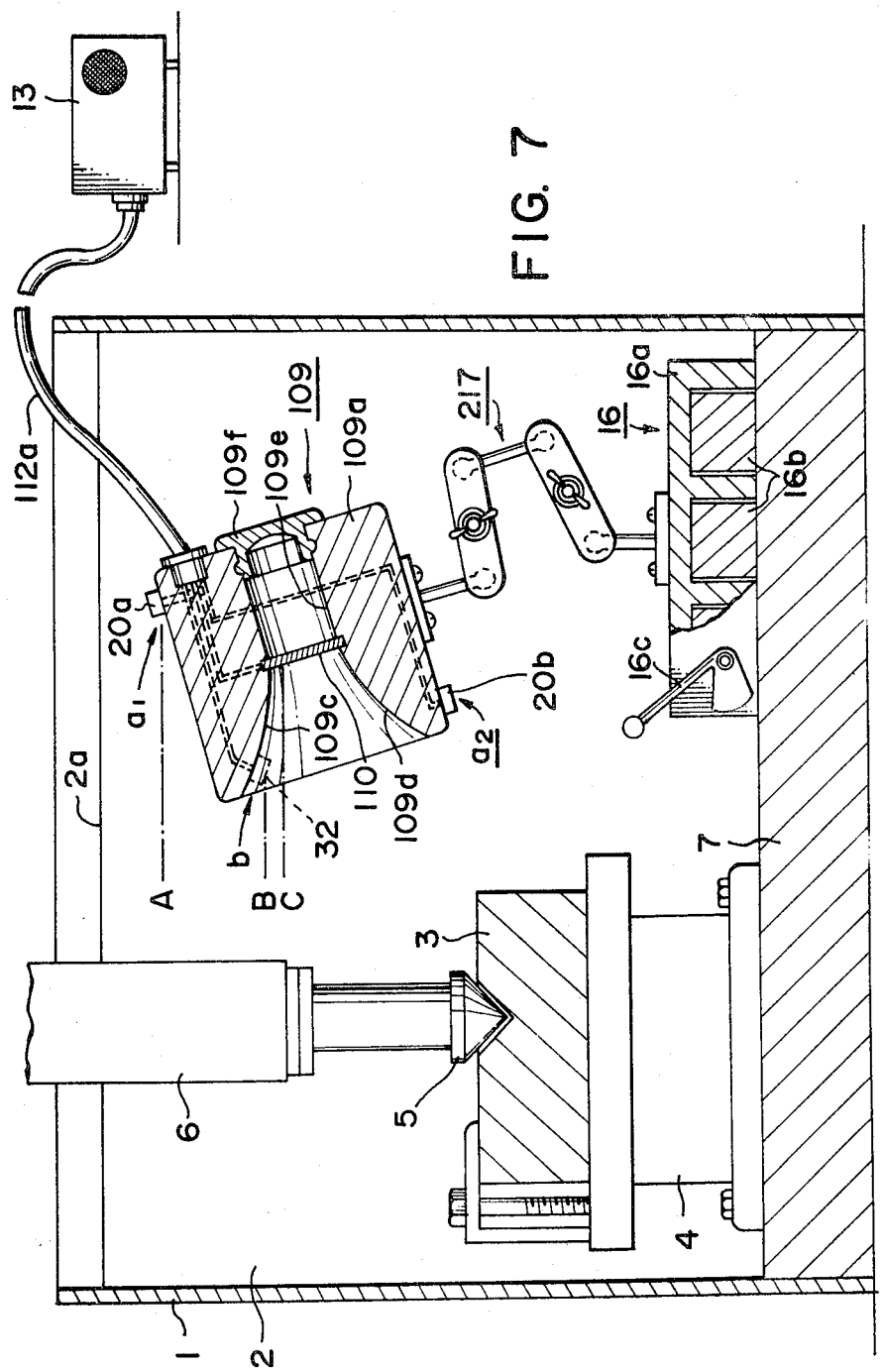

ELECTRICAL MACHINING APPARATUS

CROSS-REFERENCE TO EARLIER APPLICATION

This application discloses the subject matter disclosed in part in copending application Ser. No. 004,987 filed 19 Jan. 19, 1979 (U.S. Pat. No. 4,289,947).

FIELD OF THE INVENTION

The present invention relates to electrical machining such as electrical discharge machining, electrochemical machining, electrochemical-discharge machining and electrodepositing. More particularly, the invention relates to an electrical machining apparatus suitable to stabilize the condition in an electrical machining gap.

The term "electrical machining" is herein intended primarily to refer to electrical discharge machining (EDM), but it should be understood that the invention is equally applicable to any other form of electrical machining such as electrochemical machining (ECM), electrochemical-discharge machining (ECDM) and electroplating (EP).

The term "machining" is thus used herein broadly to include a material removal process, such as sinking, shaping, cutting, drilling or grinding, in which material is removed from a workpiece as well as a material addition process such as plating, depositing or forming, in which material is removed from a machining liquid and added to the workpiece.

In both processes, as they are especially concerned here, a tool electrode is juxtaposed with a workpiece to define a minute machining gap therebetween in the presence of a machining liquid or medium and an electric current is passed between the electrode and the workpiece through the liquid-filled minute machining gap to electrically remove or add material from or to the workpiece surface. A power supply for furnishing the machining current is designed preferably to provide a high-current density in the region of the machining gap such that material removal from or addition on the workpiece surface may take place in close conformity with the shape of the tool electrode. Means is commonly provided to advance one of the tool electrode and the workpiece towards the other so as to maintain the machining gap substantially constant as material removal from or addition on the workpiece surface proceeds.

BACKGROUND OF THE INVENTION

It has long been recognized that the electrical machining of a conductive workpiece, e.g. the electrical-discharge machining, electrochemical machining or electroplating of workpiece portions juxtaposed with an electrode, is often characterized by a non-uniform current distribution across the gap separating the electrode surface from the workpiece surface to be machined. This nonhomogeneous current distribution mostly derives from a contamination of the machining medium in the form of accumulations or concentrations of ions, machining chips and other gap products, along one or the other surface of the electrodes. Moreover, the non-uniform distribution of the flow of current between the surfaces was also found to be, in part, a function of magnetic effects resulting from the passage of current between the electrode and the workpiece.

In U.S. Pat. No. 3,252,881 issued May 24, 1966 to Kiyoshi Inoue, it was pointed out that it was possible to effect mechanical dislodgment of ionic contaminants in an electrochemical machining gap by applying to the electrode a mechanical oscillation toward and away from the workpiece at a relative low or sonic frequency (e.g. from 10 cycles/second to 10 kilocycles/second). It was also shown that a similar result was obtained when, concurrently with the mechanical vibration of the electrode, the injection of a gaseous fluid into the electrolyte or as an alternative thereof, a supersonic vibration is applied to the electrolyte within the electrode. The supersonic vibration can have a frequency ranging between substantially 10 kilocycles/seconds and 10 megacycles/second and can be produced by an electro-sonic transducer mounted within the interior of the tubular electrode.

It has been found that the ultrasonic vibration may be employed in electrical-discharge machining and electroplating as well to remove the gap contaminants in these processes. For example, in electrical-discharge machining, it has been found that the ultrasonic vibration serves to stabilize the machining condition and protect the workpiece and the electrode from short-circuiting damage. In electroplating, the accumulation of electrolytic bubbles tends to be removed as a result of imparting an ultrasonic vibration to the electrolyte so that a fine plated layer may be obtained on the workpiece surface. In these processes it has been the conventional practice to impart an ultrasonic vibration to the machining liquid by means of an ultrasonic transducer element which is simply immersed therein in a worktank or attached to the wall of the latter.

The transducer element immersed in the machining liquid in the worktank has commonly the individual vibrating surfaces on its opposite sides in contact with the machining liquid. It has now been observed that the ultrasonic vibrations individually emitting from the two surfaces tend to interfere with each other in the machining liquid so that only the composite vibration which is much damped in amplitude and energy is available to the region of the machining gap. The compensation for the large loss of energy requires an increase in the input power which results in an excessive heating of the transducer element and the consequential damage thereof or detrimental effects to the machining liquid.

Furthermore, when the shape of a workpiece contains irregular curvatures or involves a deep boring or slitting and thus represents two-dimensional or three-dimensional forming, it has been found that a uniformity of the gap decontamination effect is not attainable by means of a transducer element if arranged in one or another manner as done heretofore. It has thus been a problem with conventional ultrasonic vibrator systems to effect the gap decontamination satisfactorily, efficiently and uniformly over the entire working area being processed by electrical machining.

OBJECT OF THE INVENTION

It is accordingly an object of the present invention to provide an improved electrical machining apparatus whereby the decontamination of the region of the machining gap is achieved satisfactorily, efficiently and uniformly.

Another object of the invention is to provide an improved electrical machining apparatus whereby the decontamination of the region of the machining surfaces having an intiricate configuration is attained with extremely high uniformity.

SUMMARY OF THE INVENTION

These and other objects are attained, in accordance with the present invention, by providing an electrical machining apparatus having a worktank for containing a machining liquid and having a workpiece immersed therein; and a tool electrode positionable to be juxtaposed with the workpiece in the worktank to define an electrical machining gap therebetween filled with the machining liquid, which apparatus includes an ultrasonic assembly disposed in the worktank and comprising a head member and a support member, the head member being constituted by a housing means having an ultrasonic transducer element supported thereby and an opening for permitting only one of the two opposite side surfaces of the transducer element to be held in contact with the machining liquid and to communicate with the region of the machining gap via the machining liquid, the housing being supported in the machining liquid by the support member to direct the said opening selectively towards the region of the machining gap; and a power supply for energizing the ultrasonic transucer element to produce ultrasonic vibrations and to impart the vibrations to the machining liquid in contact with the said one side surface thereof, thereby transmitting the imparted ultrasonic vibrations preferentially to the region of the machining gap.

BRIEF DESCRIPTION OF THE DRAWING

These and other objects, features and advantages of the present invention will become more readily apparent from the following description of certain embodiments thereof taken with reference to the accompanying drawing in which:

FIG. 7 is an elevational view partly in section, diagrammatically illustrating an apparatus similar to that shown in FIGS. 1, 4 and 5 having an ultrasonic assembly incorporating means for sensing the machining liquid surface;

SPECIFIC DESCRIPTION

Figure 1:
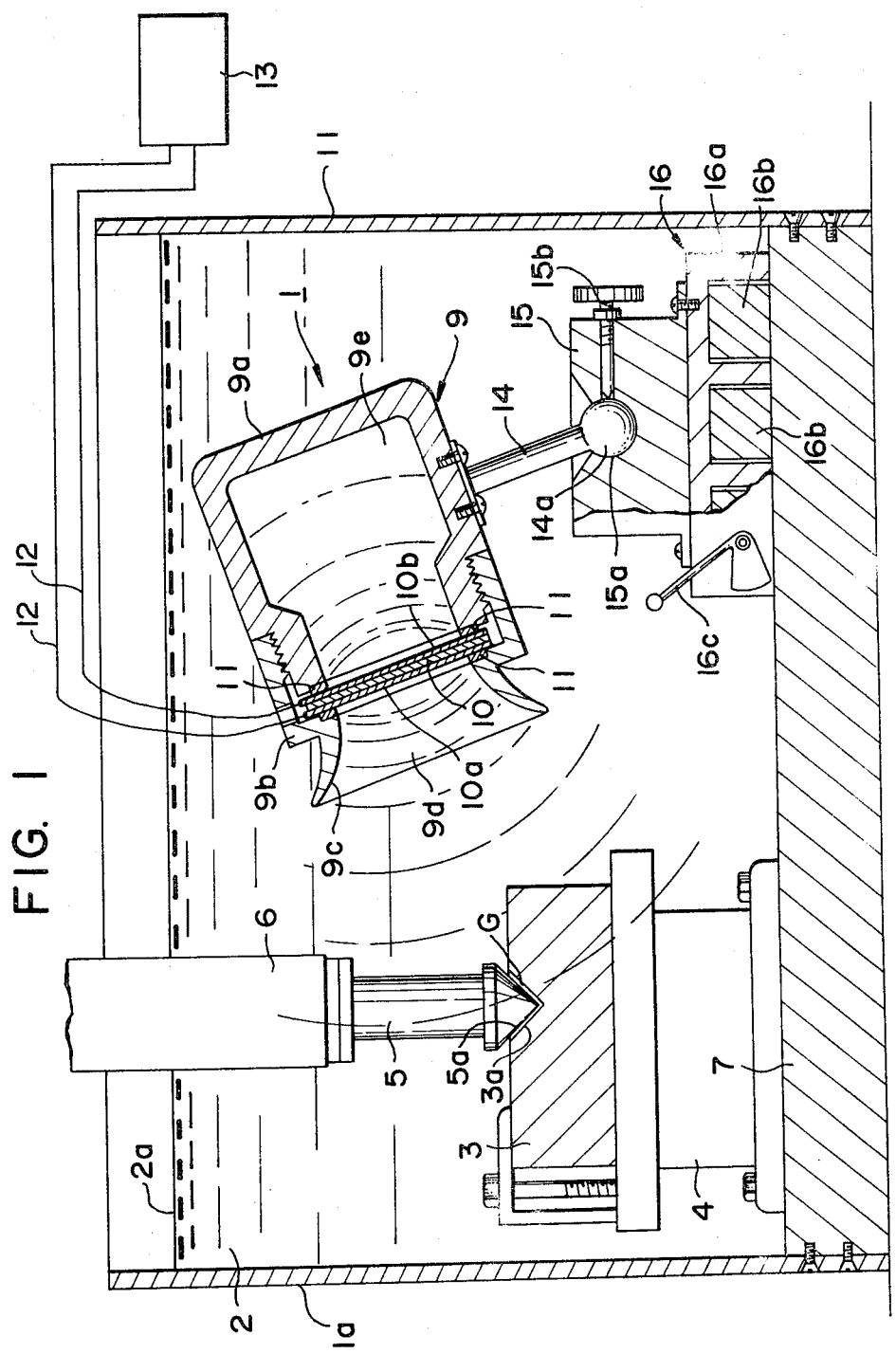
FIG. 1 is an elevational view partly in section, diagrammatically illustrating an electrical machining apparatus including a novel ultrasonic assembly constructed and positioned in accordance with the present invention.

Referring first to FIG. 1, an electrical machining apparatus includes a worktank 1 containing a machining liquid 2 which may be a liquid dielectric such as distilled water, kerosine or transformer oil in EDM, a liquid electrolyte such as a potassium nitrate solution in ECM or a liquid electrolyte of any desirable plating composition in EP. In the worktank 1, a workpiece 3 is securely mounted on a mounting table 4 and is juxtaposed with a tool electrode 5 which depends from an electrode support member 6. The worktank 1 has at its bottom a base 7 on which the mounting table 4 is securely held. The side walls 1a of the tank 1 is of a height for accommodating the machining liquid 2 such that the region of the tool electrode 5 juxtaposed with the workpiece 3 is immersed therein sufficiently deeply below the liquid surface 2a. The tool electrode 5 and the workpiece 3 are energized by an electrical machining power supply (not shown) so that material is removed from the workpiece 3 to yield the machined surface 3a of a shape complementary to that of the shaped electrode face 5a of the electrode 5 or material from the electrolyte 2 is deposited on the shaped workpiece surface 3a uniformly spaced from the electrode surface 5a to form a deposition layer of uniform thickness. The tool electrode 5 is advanced towards the workpiece 3 as material removal proceeds or is retracted away from the workpiece 3 as material deposition proceeds so as to maintain the minute machining gap spacing at G substantially constant.

An ultrasonic assembly 8 is also immersed in the machining liquid 2 within the worktank 1 and includes a head portion or housing 9 comprising a base casing 9a and a complementary rigid shell 9b having a divergent frustoconical opening 9c. The base casing 9a and the rigid shell 9b are composed of a metal or hard synthetic resin and are threadedly coupled together.

An ultrasonic vibration transducer 10 is supported between the base casing 9a and the shell 9b so that the volume of the housing 9 is divided into an outwardly open space 9d and a closed space 9e. Gaskets 11 are used to hermetically seal the closed space 9e against entry of the machining liquid 2 therein. As a result, only one side surface 10a of the transducer 10 is in contact with the machining liquid 2 while the other side surface 10b is in contact with the air in the closed space 9e and completely separated from the machining liquid.

The transducer 10 may be composed of a piezoelectric (or electrostrictive) or magnetostrictive element and is energized via conductors 12 by a high-frequency power supply 13 so that the transducer 10 produces mechanical oscillations of an utlrasonic frequency which may be as low as 20 to 30 kHz but is preferably in excess of 50 kHz, and still more preferably is in excess of 100 kHz and up to 10 MHz.

The head 9 is supported fixedly on a mounting rod 14 having a spherical end 14a slidably received in a recess 15a of a support block 15 so that the head 9 is swivelly movable about the spherical end 14a. The block 15 is provided with an adjustment screw 15b to securely hold the sphere 15a, thereby holding the head 9 in a desired angular or swivel position. The block 15 is securely mounted on a magnetic retainer 16 which is in turn releasably mounted on the base 7 which is composed of a magnetically permeable material. The magnetic retainer 16 comprises a magnetically permeable frame member 16a and electromagnets 16b and includes a lever switch 16c adapted to connect the coils of the electromagnets 16b to a current source (not shown).

Thus, when the lever 16c is in one position the electromagnets 16b are deactivated to release the assembly 16 from the base 7. The assebmly 16 is located in a desired position on the base 7 in the worktank 1 by moving the lever 16c in the other position, causing the electromagnets to be activated to magnetically attract the frame member 16a to the base 7. The screw 15b in the support block 15 is then manipulated to adjust the angular position of the supporting rod 14 so that the head 9 is swung to direct the opening 9c and the transducer 10 selectively towards the region of the electrical machining gap G between the tool electrode 5 and the workpiece 3.

The arrangement thus assures that the ultrasonic vibration emitted from the transducer 10 through the frustoconical opening 9c of the shell 9b propagates through the machining liquid selectively towards the machining region. Further, only the outer surface 10a of the transducer 10 is in contact with the machining liquid. Since the other side surface 10b of the transducer which is located opposite to the direction of the machining region is simply in contact with the air in the closed space 9e in the housing 9, there is practically no loss of the vibrational energy caused by the oscillation of this second surface 10b and the vibrational energy from the first side surface 10a is applied, practically with no interference and with a maximum efficiency, to the region of the machining gap G.

As a modification of the foregoing arrangement of the transducer 10 in the head 9, the element 10 can be attached to a ring of a hard plastic which is in turn mounted securely to the base casing 9a with or without using the shell member 9b. It may also be possible to tightly seal the opening of the casing 9a with a relatively thin flexible disk and then attach the element 10 to a center region of the disk on the outer side surface thereof.

Figure 2:
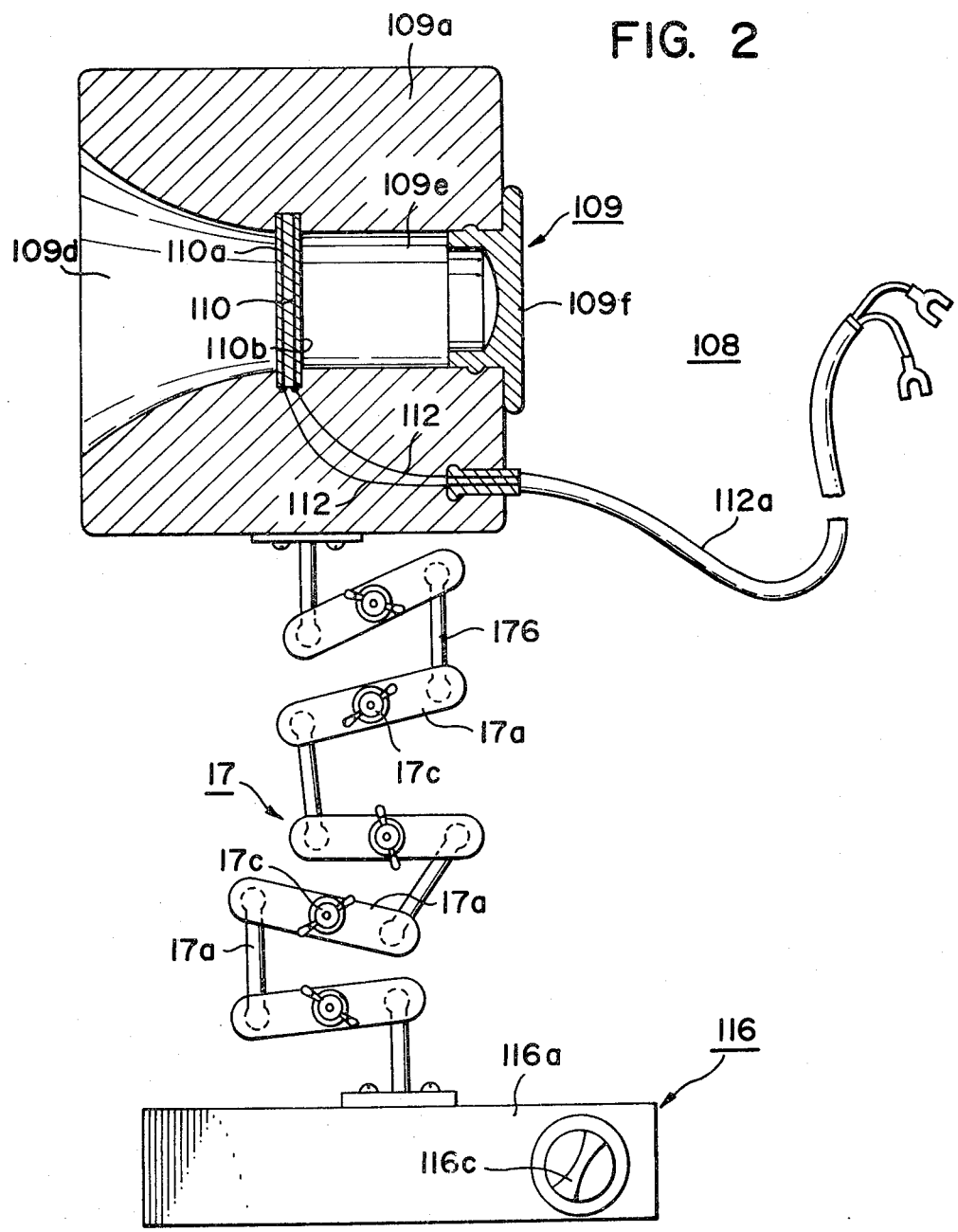
FIG. 2 is an elevational view partly in section, diagrammatically illustrating another ultrasonic assembly embodying the present invention.
Figure 3:
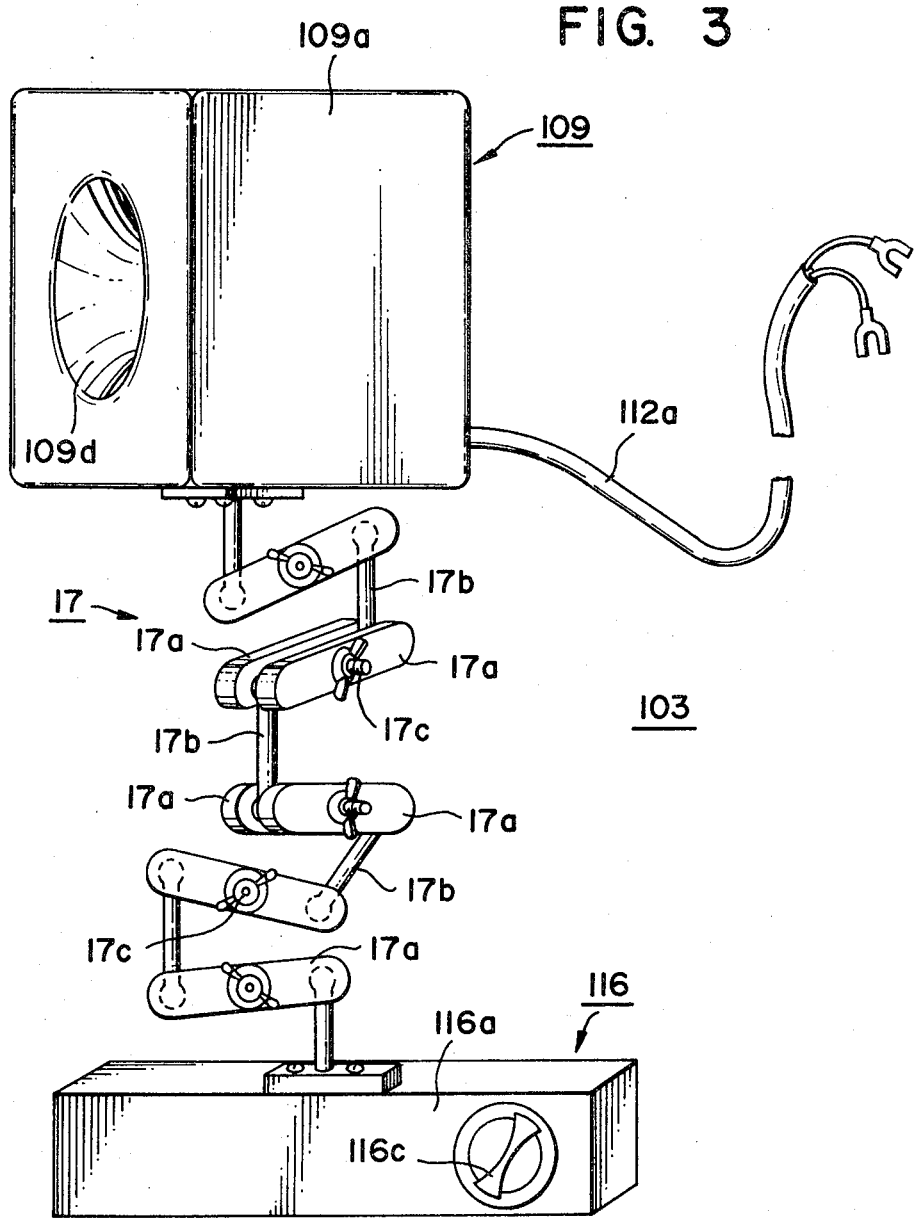
FIG. 3 is a diagrammatic view in perspective of the ultrasonic assembly of FIG. 2.

FIGS. 2 and 3 show another form of the ultrasonic assembly 108 comprising a housing 109 in the form of a rigid rectangular body 109a having a cylindrical bore whose one end is tightly sealed with a rubber cap 109f, and the other end of which is frustoconically shaped. The body 109a may be a molded body of a hard plastic or rubber and has a transducer disk 110 secured thereto so that the sealed volume of the housing 109 is divided into an outwardly open space 109d and a tightly closed space 109e. The transducer 110 and conductors 112 therefor, covered with an insulating sheath 112a are previously set in position in a mold and a fluidic plastic or rubber is cast in the mold for solidification. Since the body 109a, element 110 and conductors 112 are integrally shaped by molding, the housing assembly 109 is assured against current and liquid leakage.

The housing body 109a is fixedly secured to and supported by a multi-articulate support member 17 which is in turn securely mounted on a magnetic retainer 116 which is releasably mounted on the base 7 (FIG. 1). The multi-articulate support member 17 includes in each step a pair of plates 17a holding therebetween the lower end of a bar 17b in the preceding step at their one end and the upper end of a bar 17b at their other ends. Each pair of plates 17a are secured together by means of a thumbscrews 17c. Thus, thumscrews 17c are loosened to allow the head 109 to be set in its height and angular position or oriented desirably towards the region of the machining gap G (FIG. 1) and are then tightened to hold that height and angular position of the head 109. The magnetic retainer 116 is basically of the same type as is shown in FIG. 1 and includes an operating button switch 116c in lieu of the lever switch.

Figure 4:
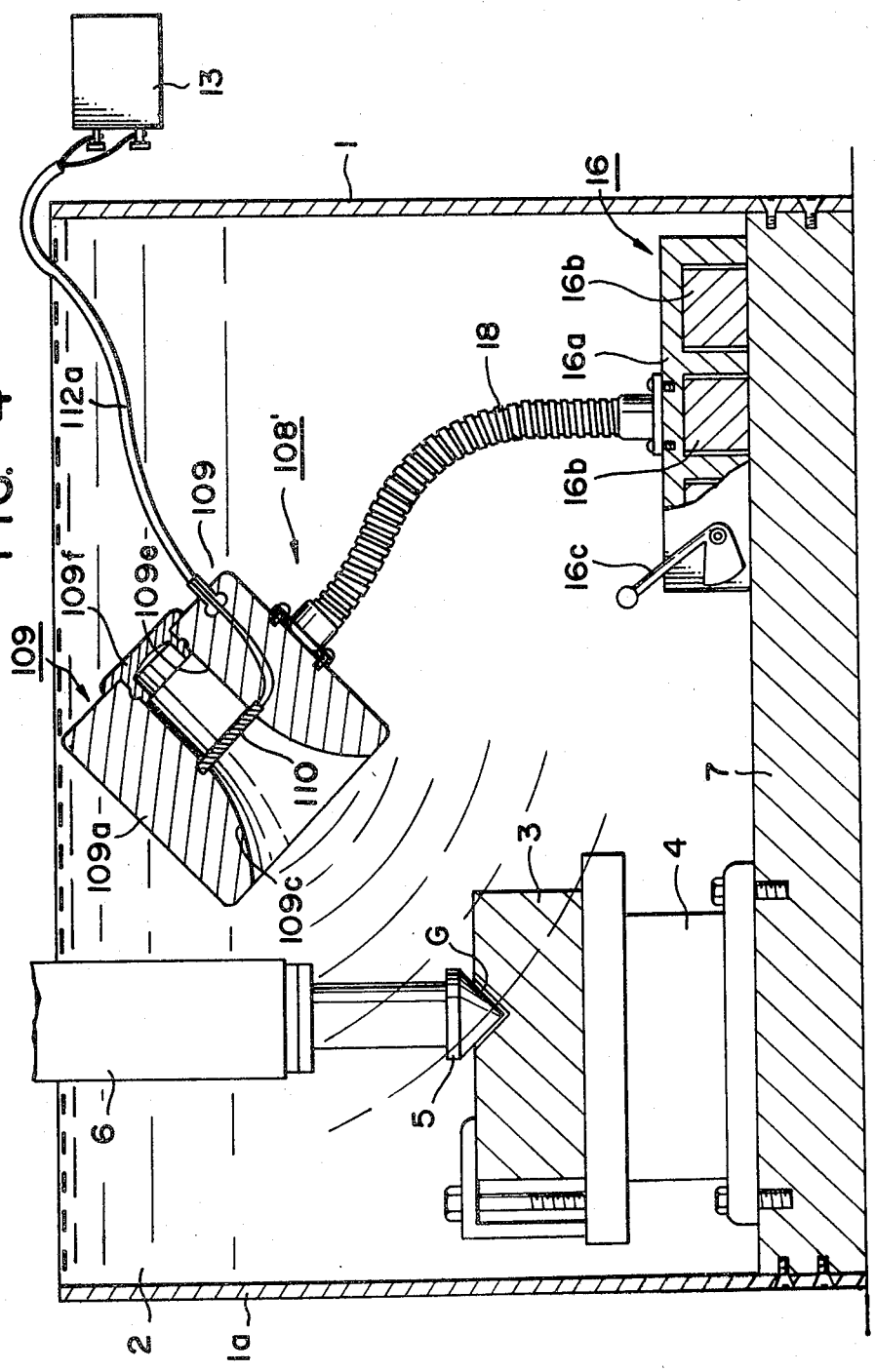
FIG. 4 is an elevational view partly in section, diagrammatically illustrating an electrical machining apparatus including an ultrasonic assembly similar to that of FIGS. 2 and 3 and modified with respect to its support member according to the invention.

FIG. 4 shows an electrical machining apparatus arranged as shown in FIG. 1 and an ultrasonic assembly 108' comprising the head 109 of the type sown in FIGS. 2 and 3, the head 109 being supported by a flexible, self-sustaining arm or tubular support 18, in lieu of of the multi-articulate support member or linkage, on the magnetic retainer 16 already described. The flexible, self-sustaining arm or tubular support 18 may be of any suitable conventional flexible-joint shaft or pipe composed of a series of jointed tubular or solid links, and is manipulated to selectively position and orient the ultrasonic head selectively towards the region of the machining gap G as described previously.

Figure 5:
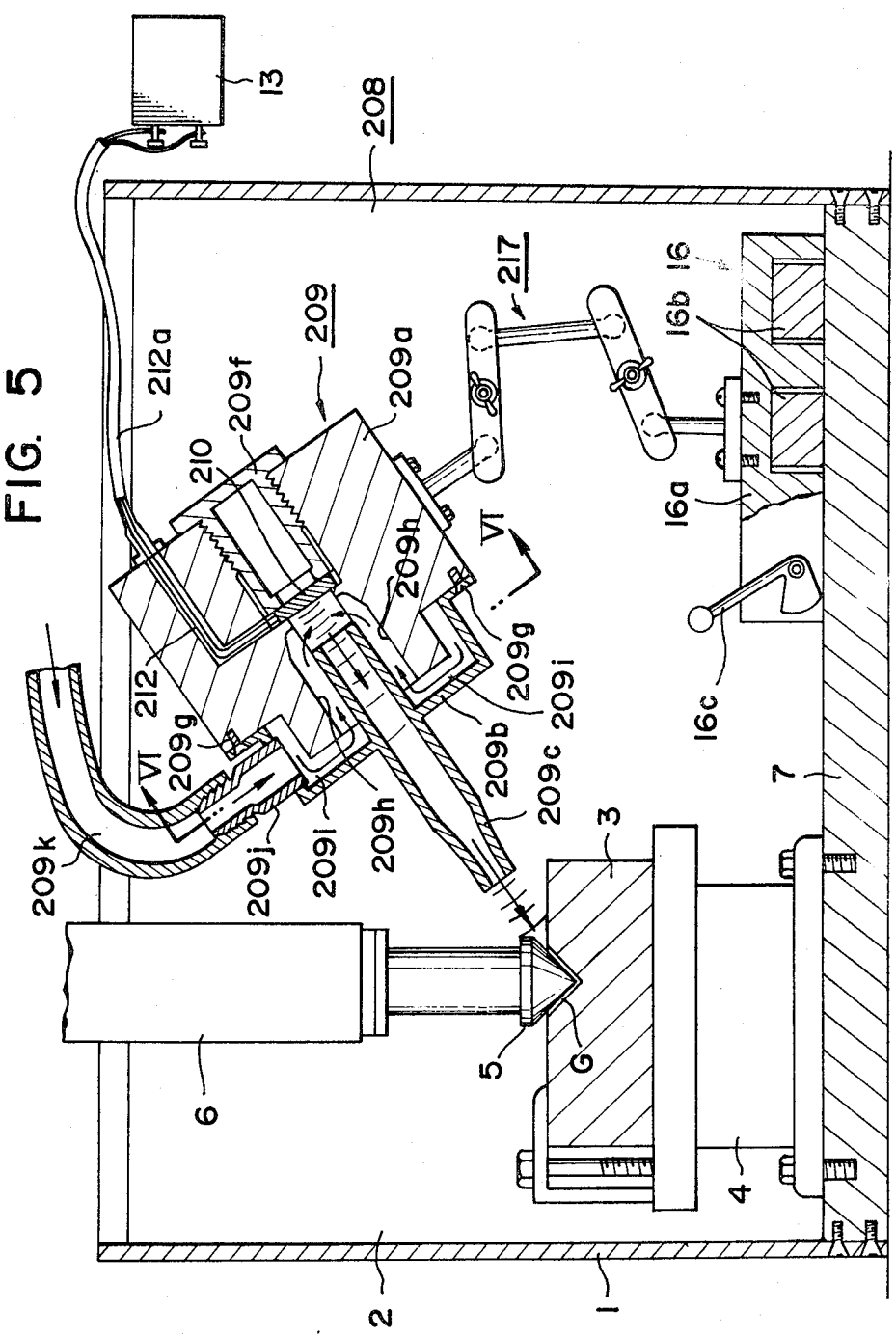
FIG. 5 is an elevational view partly in section, diagrammatically illustrating an electrical machining apparatus of a form similar to those shown in FIGS. 1 and 4 and a modified ultrasonic head having fluid passages according to the invention.
Figure 6:
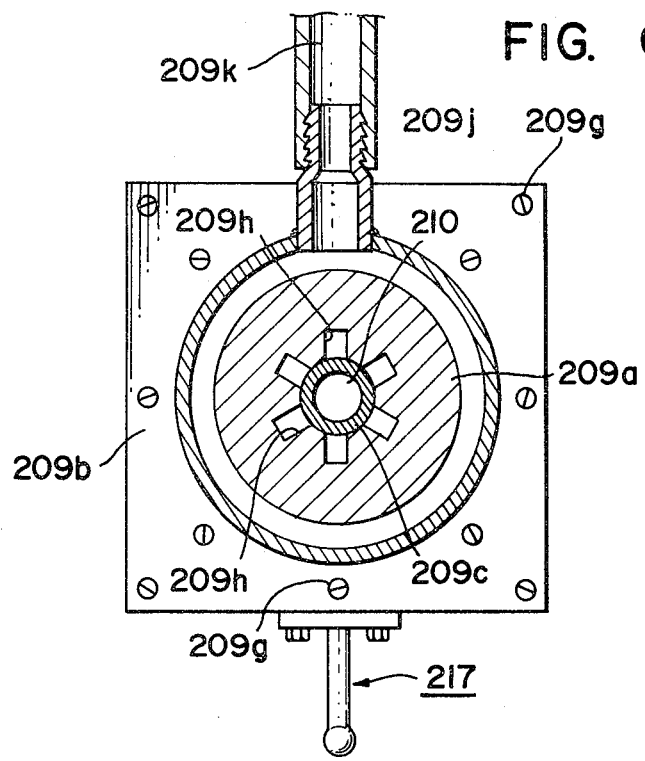
FIG. 6 is a sectional view of the ultrasonic nozzle head of FIG. 5 taken along line VI—VI.

A further embodiment of the assembly 208 shown in FIG. 5 makes use of a modified ultrasonic head 209 supported by a multi-articulate linkage unit 217 and the magnetic retainer 16 both of which have already been described. Referring also to FIG. 6, the head 209 comprises a hollow base body 209a and a hollow cap 209f which are threadedly coupled together to hold an ultrasonic transducer element 210 in position as described previously. In this embodiment, however, a rigid shell or covering 209b formed with a projecting nozzle 209c directed towards the region of the machining gap G is secured to the base body 209a by means of screws 209g and are so designed as to form fluid passages 209h and 209i for the machining liquid which is introduced through an inlet duct 209j from a conduit 209k communicating with a liquid source (not shown) including a pump. Thus, a forced flow of fresh machining liquid is established between the region of the ultrasonic vibrator 210 and the region of the machining gap G. The ultrasonic vibration caused by the transducer 210 is imparted to the flowing machining liquid so that a highly favorable machining environment is created in the machining region. The increase in the volume of the machining liquid 2 in the worktank 1 is compensated for by returning the liquid via a filter (not shown) to the source.

The ultrasonic assembly of FIG. 7, which is shown comprising the head portion 109 supported by the flexible joint linkage 217 on the magnetic retainer 16 as previously described, further includes fluid level sensors 20a and 20b secured on the base body 109a at upper and lower positions $a_1$ and $a_2$ thereof, respectively. The sensors 20a and 20b may each comprise a thermistor, for example, and are connected to the power supply 13 for energizing the transducer 110 in any of the manners illustrated in FIGS. 8–10. When the surface 2a of the machining liquid 2 in the worktank 1 levels down to a position A, the thermister 20a is exposed to the air and operates a control circuit in the power supply 13 to halt the vibration of the transducer 110.

Figure 8:
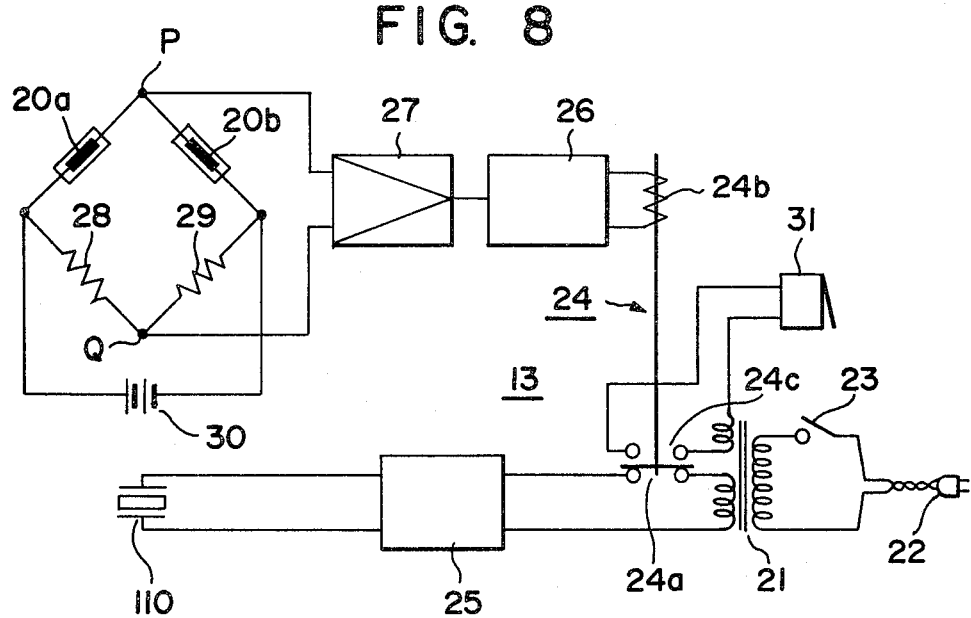

Referring to FIG. 8, the power supply 13 is shown comprising a transformer 21 whose primary winding is connected to a commercial AC source (not shown) via a plug 22 and a switch 23 and whose secondary winding is connected via contacts 24a of an electromagnetic switch 24 which are held in position by a spring-force switch 24 which are held in position by the spring force and a high-frequency generator 25 to the transducer 110. The electromagnetic switch has an operating coil 24b energized by a control circuit 26 fed by an amplifier 27 whose input terminals are connected across junctions P and Q of a Wheatstone bridge constituted by thermistors 20a and 20b and resistors 28 and 29 arranged as shown and energized by a DC source 30. The electromagnetic switch 24 has second contacts 24c connected in series with an additional secondary winding of the transformer 21 and a buzzer 31.

The thermistors 20a and 20b are assumed to be of the same operating characteristic and the resistors 28 and 29 to be of the same resistance. When the two thermistors 20a and 20b energized by the DC source 30 are both immersed in the machining liquid 2 of a given temperature, there is no voltage drop between the junctions P and Q in the Wheatstone bridge 20a, 20b, 28, 29. When the surface 2a of the machining liquid levels down to position A and the thermistor 20a is exposed to the air, the thermistor 20a alters its state of emission of heat so that there is caused a temperature difference between the thermistors 20a and 20b. This will cause a voltage drop to be created between juctions P and Q and a current to flow between them. The current is amplified by the amplifier 27. The control circuit is responsive to the amplified current and, when it exceeds a preset value, energizes the coil 24b to actuate the switch 24. The contacts 24a are thus broken to separate the secondary winding of the transformer 21 from the oscillator 25 to deenergize the transducer 110 and contacts 24c are established to energize the buzzer 31 to issue an audible alarm signal. The switch 23 can then be opened and a supply of the machining liquid furnished into the worktank 1 to restore the surface 2a in the worktank to a sufficient level. Then the switch 23 can be closed to permit the power to be furnished to the oscillator 25 via the contacts 24a which have been reestablished by the spring pressure to resume the vibration of the transducer 110.

Figure 9:
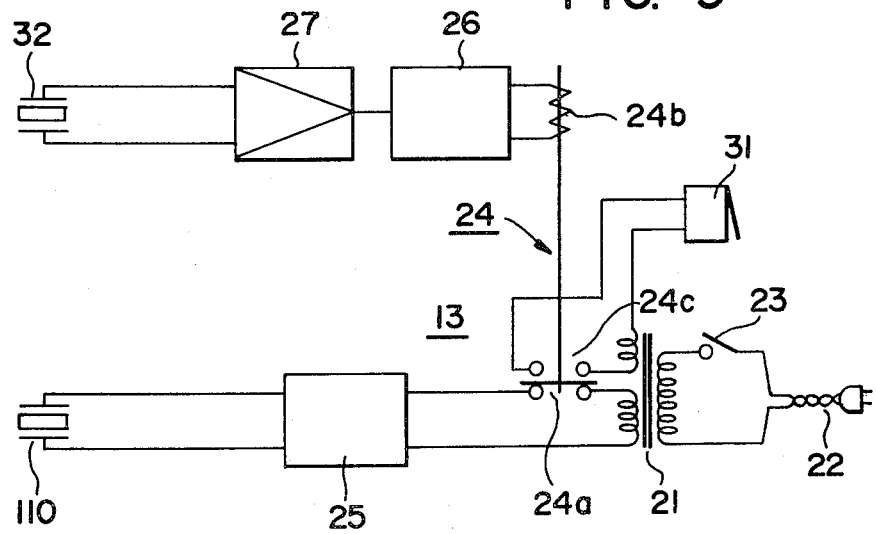

The circuit arrangement of FIG. 9 is designed to operate with a vibration-sensitive element 32 as the sensor 20a, 20b, which may be a piezoelectric or electrostrictive or magnetostrictive element attached on the frustoconical surface 109c of the base body 109a at a position as shown in FIG. 7. As long as the element 32 remains immersed in the machining liquid 2, the ultrasonic waves transmitted from the transducer 110 are sufficient to cause full vibrations of the element 32. When the surface 2a drops to position B and the element 32 becomes exposed to the air, the element 32 suddenly reduces its output current. The control circuit connected via the amplifier 27 to the element 32 is then operated to energize the coil 24b.

Figure 10:
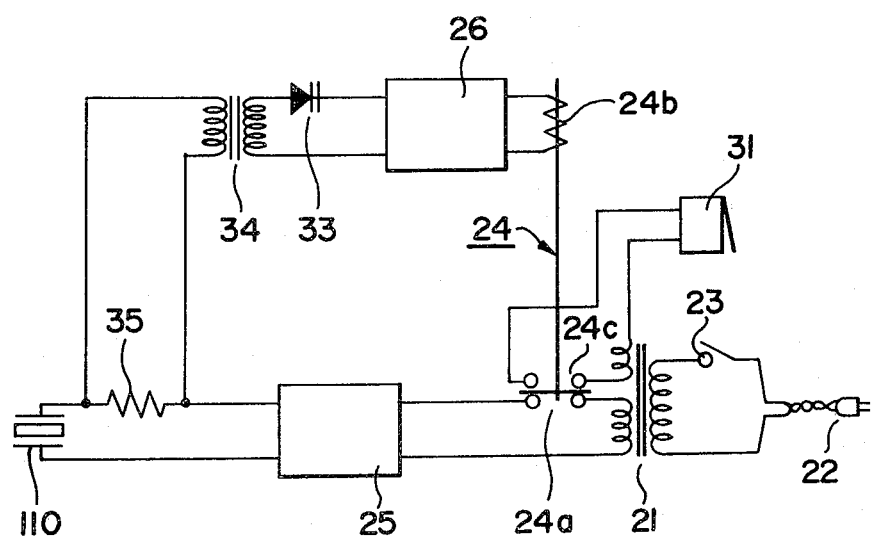
FIGS. 8, 9 and 10 are circuit diagrams illustrating an ultrasonic power supply with various sensing circuits for use in conjunction with the system of FIG. 7.

In the arrangement of FIG. 10, the transducer 110 itself is used to serve as a level sensor. In this embodiment, the input terminals to the control circuit 26 are connected via a diode 33 to the secondary winding of a transformer 34 whose primary winding is connected across a resistor 35 connected in the circuit between the oscillator 25 and the transducer 110. As long as the transducer 110 remains immersed in the machining liquid 2, its consumed electrical power is practically constant. When the liquid surface 2a drops to position C and the transducer 110 becomes partly exposed to the air, there occurs a sudden change in the current passing through the transducer 110 and the sensing resistor 35 due to a reduction in the liquid pressure on the transducer 110 which determines the load characteristic thereof. The control circuit 26 here again responds to the change via the transformer 34 and the diode 33 so that the coil 24b is energized.

Figure 11:
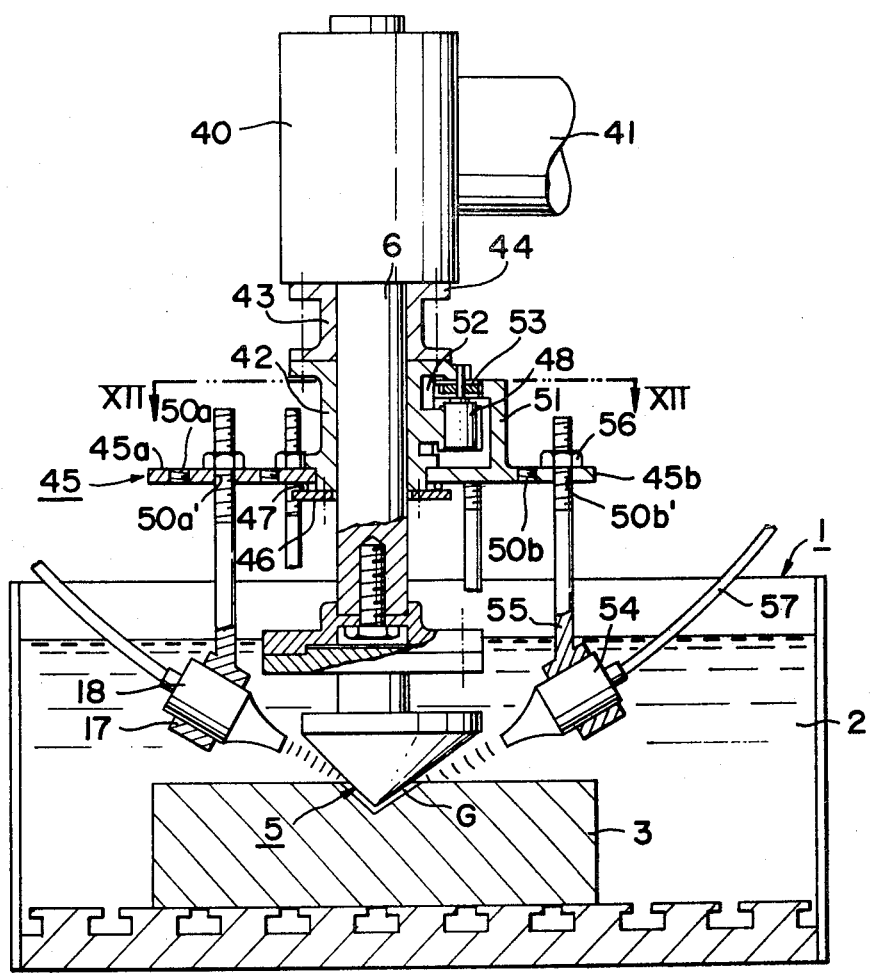
FIG. 11 is an elevational view partly in section, diagrammatically illustrating a system of the invention using a plurality of ultrasonic heads positioned to surround and each directed to, the region of the machining gap.
Figure 12:
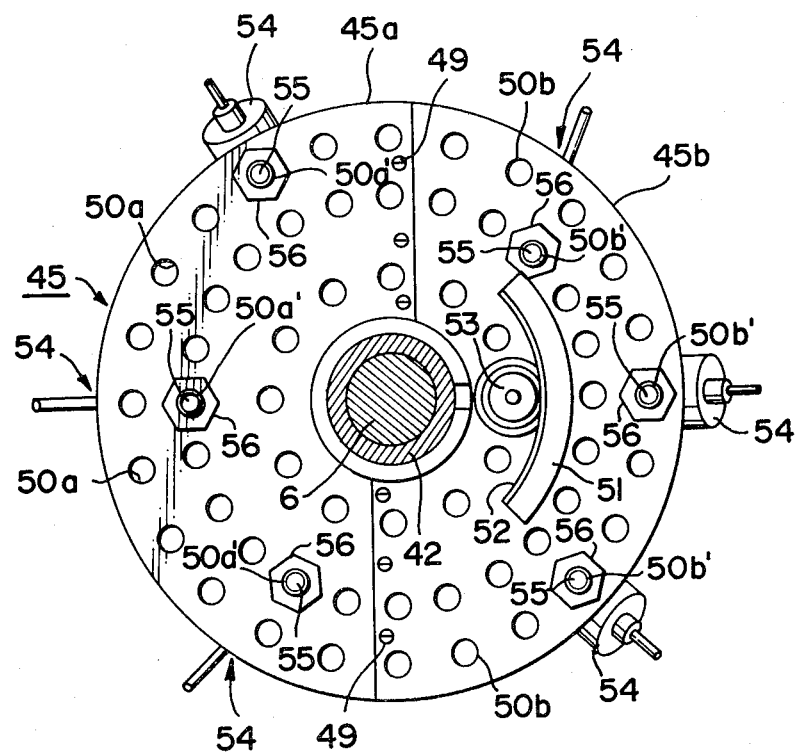
FIG. 12 is a cross-sectional view of a portion of the apparatus of FIG. 11 taken along line XII—XII.

In FIG. 11 there is shown still another arrangement of the invention embodied in an electrical discharge machining apparatus. The stem 6 supporting the tool electrode 5 is here shown displaceably carried in a machine head 40 attached to an arm 41. A collar 42 for the stem 6 is secured to the machine head 40 by means of a split collar segments 43 and 44 provided to adjust the height of the collar 42. Referring also to FIG. 12, a rotary disk 45 is coupled to the collar 42 rotatably on a supporting thrust bearing disk 46 via ball bearins 47 and is rotated about the axis of the stem 6 by means of a geared motor 48 secured to the collar 42. The rotary disk 45, as better shown in FIG. 12, comprises segments 45a and 45b assembled together by means of bolts 49 and having a plurality of holes 50a, 50b. One of the disk segments 50b is also formed with an arcuate projection 51 having a toothed inner rim 52 in engagement with a spur gear 53 secured to the rotary shaft of the motor 48. Ultrasonic assemblies 54 in a desired number, shown here by six, supported by their respective supports 55, are mounted as shown to the rotary disk 45 through selected holes 50a', 50b' therein for receiving the supports 55 and securing them by means of nuts 56. The number and the respective positions of the ultrasonic assemblies 54 used are determined corresponding to the particular configulation and size of the region of the machining gap G formed between the workpiece 3 and the tool electrode 5.

Each of the assemblies 54 here diagrammatically shown includes advantageously a head portion supported by a support member 55, the head portion being constituted by a housing means having an ultrasonic transducer element supported therein and an opening for permitting only one of the two opposite side surfaces of the element to be held in contact with the machining liquid and to communicate with the region of the machining gap G via the machining liquid 2. The assembly 54 when mounted on the rotary disk 45 is positioned to direct the opening and the transducer element selectively towards the region of the machining gap G. The transducer elements may be connected via conductors 57 to a common power supply of the type shown in FIGS. 8-10.

In operation, by virtue of the arrangement that the plural assemblies 54 are located to surround the region of the machining gap G to apply individually created ultrasonic vibrations from different radial directions, a highly favorable decontamination effect in the region of the machining gap G results. The motor 48 may then be controlled by a control circuit so that its operation periodically changes the rotary direction to cause the rotary disk 45 and hence the mounted assemblies 54 in unison to oscillate within a given angular span. In this manner, the ultrasonic vibration energy is transmitted to distribute uniformly throughout the entire area of the machining gap regardless of any intricacy of the configuration of the area. As a consequence, the uniformity and completeness of the removal of machining chips, gases and other gap contaminants is assured to allow machining to proceed with an enhanced stability and efficiency.

Also, the individual assemblies 54 may be energized by different power supplies. Thus, one group of assemblies may be energized to produce vibrations of one frequency and another group may be energized to produce vibrations of another frequency.

What is claimed is:

1. An electrical machining apparatus having a worktank for containing a machining liquid and having a workpiece immersed therein, and a tool electrode positionable to be juxtaposed with the workpiece in the worktank to define an electrical machining gap therebetween filled with the machining liquid, said apparatus including:

an ultrasonic assembly disposed in said worktank and comprising a head member and a support member, said head member being constituted by a housing means having an ultrasonic transducer element supported therein and an opening for permitting only one of the two opposite side surfaces of said transducer element to be held in contact with the machining liquid and to communicate with the region of said electrical machining gap via the machining liquid, the head member being supported in the machining liquid by said support member to direct said opening selectively towards the region of said machining gap; and a power supply for energizing said transducer element to produce ultrasonic vibrations therein and to impart the vibrations to the machining liquid in contact with said one side surface thereof, thereby transmitting the imparted ultrasonic vibration at least preferentially to the region of said machining gap.

2. The apparatus defined in claim 1 wherein said transducer element is supported in said housing means so as to divide the inner volume thereof into an open space defined at least partly by said opening and a closed space filled with air and separated from said machining liquid.

3. The apparatus defined in claim 2 wherein said support member includes an elongate member which is flexible and capable of self-sustaining said head member.

4. The apparatus defined in claim 3 wherein said elongate member comprises a flexible multi-joint pipe.

5. The apparatus defined in claim 3 wherein said elongate member comprises a multi-joint linkage.

6. The apparatus defined in claim 3 wherein said support member includes an electromagnetic retainer for mounting said elongate member thereon, said retainer being mounted upon a magnetically permeable base member in said worktank and comprising a magnetically permeable body member and an electromagnet energizable to magnetically attract said body member to said base member.

7. The apparatus defined in claim 1 wherein said housing means includes a fluid passage connected to a source of said machining liquid and to the region of said machining gap via at least one nozzle means, further including pumping means for producing a forced flow of the machining liquid through said passage into said machining gap region.

8. The apparatus defined in claim 1, further comprising means for sensing the surface of said machining liquid in said worktank with respect to the position of said transducer element therein and control means responsive to said sensing means for controlling said power supply.

9. The apparatus defined in claim 8 wherein said control means is adapted to electrically disconnect said transducer element from said power supply when the region of said transducer element becomes at least partly exposed to air.

10. The apparatus defined in claim 8 wherein said sensing means includes a thermistor attached to said housing means.

11. The apparatus defined in claim 8 wherein said sensing means includes an additional transducer element having the same operating characteristic as said first first-mentioned transducer element and attached to said housing means.

12. The apparatus defined in claim 8 wherein said sensing means is constituted by said transducer element.

13. An apparatus as defined in claim 1, including a plurality of ultrasonic head members each of which is constructed and adapted to function in the manner defined, said head members being disposed to surround the region of said machining gap to apply ultrasonic vibrations created individually therein to said machining region from different directions.

14. The apparatus defined in claim 13, further including means for displacing said plurality of head members relative to said machining region.

15. The apparatus defined in claim 13 wherein said displacing members is adapted to oscillate said plural head means in unison.

16. The apparatus defined in claim 1 wherein said transducer element is energized by said power supply to produce ultrasonic vibrations of a frequency between 50 kHz and 10 MHz.

17. The apparatus defined in claim 16 wherein said frequency is in excess of 100 kHz.

18. A method of operating an electrical machining apparatus having a tank containing a machining liquid and receiving a workpiece immersed in said liquid, and a tool electrode juxtaposed with the workpiece in said tank to define an electrical machining gap therebetween filled with said liquid, said method comprising:

disposing in said tank an ultrasonic assembly comprising a head member and a support member, said head member being constituted by a housing means having an ultrasonic transducer element supported therein and an opening for permitting only one of two opposite side surfaces of said transducer element to be held in contact with the machining liquid and to communicate with the region of said electrical machining gap via the machining liquid, the head member being supported in the machining liquid by said support member to direct said opening selectively towards the region of said machining gap;

vibratingly energizing said transducer element so that said one of said side surfaces directs said vibration preferentially to the region of said gap; and intercepting vibrations from at least the other of said opposite side surfaces to prevent interference with the vibration directed toward said gap.

* * * * *